(12) United States Patent
Kim et al.

(10) Patent No.: US 8,638,807 B2
(45) Date of Patent: Jan. 28, 2014

(54) METHOD FOR MANAGING ETHERNET RING NETWORK OF VLAN-BASED BRIDGE

(75) Inventors: Dae Ub Kim, Daejeon (KR); Sang Min Lee, Daejeon (KR); Jeong Dong Ryoo, Daejeon (KR); Jea Hoon Yu, Daejeon (KR); Tae Whan Yoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 613 days.

(21) Appl. No.: 12/841,646

(22) Filed: Jul. 22, 2010

(65) Prior Publication Data

US 2011/0019536 A1    Jan. 27, 2011

(30) Foreign Application Priority Data

Jul. 24, 2009  (KR) ........................ 10-2009-0068077

(51) Int. Cl.
    *H04L 12/28*   (2006.01)
(52) U.S. Cl.
    USPC .......................................... 370/422; 370/392
(58) Field of Classification Search
    USPC ............ 370/392, 395.53, 389, 256, 409, 422, 370/395.5, 390
    See application file for complete search history.

(56) References Cited

U.S. PATENT DOCUMENTS

| | | |
|---|---|---|
| 6,208,649 B1 | 3/2001 | Kloth |
| 7,003,705 B1 | 2/2006 | Yip et al. |
| 8,315,158 B2 * | 11/2012 | Goose et al. ................. 370/222 |
| 2007/0081535 A1 | 4/2007 | Li |
| 2008/0279203 A1 | 11/2008 | Ramalho Ribeiro dos Santos et al. |
| 2009/0175280 A1 | 7/2009 | Berechya et al. |

FOREIGN PATENT DOCUMENTS

| | | |
|---|---|---|
| EP | 0924900 A2 | 6/1999 |
| KR | 10-2007-0107051 | 11/2007 |
| WO | 2007/061566 A1 | 5/2007 |

* cited by examiner

*Primary Examiner* — Chandrahas Patel
(74) *Attorney, Agent, or Firm* — Nelson Mullins Riley & Scarborough LLP

(57) ABSTRACT

A method for managing an Ethernet ring network of a VLAN-based bridge is provided that includes: registering a major-ring VLAN ID (VID) in a ring port filtering database of a ring protection link owner node in accordance with a request for registering the major ring VID from an Ethernet Ring Protection controller mounted on the ring protection link owner node of a major ring; delivering, by the ring protection link owner node, a VID registration message to other nodes which belong to the major ring through a ring port; receiving the VID registration message through the ring port and registering the major ring VID in a ring port filtering database of each node itself, by each node belonging to the major ring; and delivering, by each node belonging to the major ring, the VID registration message to other nodes belonging to the major ring through the ring port.

16 Claims, 15 Drawing Sheets

VLAN ID REGISTERED IN FDB OF CORRESPONDING PORT BETWEEN TERMINAL AND BRIDGE

VLAN ID REGISTERED IN FDB OF CORRESPONDING PORT BETWEEN BRIDGE AND BRIDGE

| B6 BRIDGE | | | |
|---|---|---|---|
| Port \ VID | 5 | 6 | 8 |
| P1 | | | |
| P2 | | | o |
| P3 | | | |
| P4 | | | |
| P5 | | o | o |
| P6 | | | |
| P7 | | | |
| P8 | | o | |
| P9 | | | |
| P10 | | o | o |
| P11 | | | |
| P12 | | | |

(a)

| B1 BRIDGE | | | |
|---|---|---|---|
| Port \ VID | 5 | 6 | 8 |
| P1 | o | o | o |
| P2 | o | o | |
| P3 | | | |
| P4 | | | |
| P5 | o | o | |
| P6 | | | o |
| P7 | o | | |
| P8 | | | o |
| P9 | | | |
| P10 | | | |
| P11 | | o | o |
| P12 | | o | |

(b)

| B2 BRIDGE | | |
|---|---|---|
| Port \ VID | 5 | 6 |
| P1 | | |
| P2 | | |
| P3 | | |
| P4 | | o |
| P5 | | |
| P6 | | o |
| P7 | | |
| P8 | o | |
| P9 | | |
| P10 | | |
| P11 | o | o |
| P12 | | |

(c)

| B5 BRIDGE | | | |
|---|---|---|---|
| Port \ VID | 5 | 6 | 8 |
| P1 | | | |
| P2 | | o | |
| P3 | | | |
| P4 | | | |
| P5 | | | |
| P6 | | | |
| P7 | | | |
| P8 | | o | |
| P9 | | | |
| P10 | | | |
| P11 | | | |
| P12 | | | |

(d)

| B4 BRIDGE | | | |
|---|---|---|---|
| Port \ VID | 5 | 6 | 8 |
| P1 | | | |
| P2 | | | o |
| P3 | | | |
| P4 | | | |
| P5 | | | |
| P6 | | | o |
| P7 | o | | |
| P8 | | | o |
| P9 | | | |
| P10 | | | |
| P11 | | | |
| P12 | | | |

(e)

| B3 BRIDGE | | |
|---|---|---|
| Port \ VID | 5 | 6 |
| P1 | | |
| P2 | o | |
| P3 | | |
| P4 | o | |
| P5 | | |
| P6 | o | |
| P7 | | |
| P8 | o | |
| P9 | | |
| P10 | | |
| P11 | | |
| P12 | | |

VLAN ID REGISTERED IN FDB OF CORRESPONDING PORT BETWEEN TERMINAL AND BRIDGE

VLAN ID REGISTERED IN FDB OF CORRESPONDING PORT BETWEEN TERMINAL AND BRIDGE

VLAN ID REGISTERED IN FDB OF CORRESPONDING PORT BETWEEN BRIDGE AND BRIDGE

VLAN ID REGISTERED IN FDB OF CORRESPONDING PORT BETWEEN TERMINAL AND BRIDGE

VLAN ID REGISTERED IN FDB OF CORRESPONDING PORT BETWEEN BRIDGE AND BRIDGE

| B6 BRIDGE | | | | | |
|---|---|---|---|---|---|
| Ring ID | M(MVID=2) | | | | |
| VID / Port | 5 | 6 | 8 | 2 | 3 |
| P1 | | | | | |
| P2 | | | ○ | | |
| P3 | | | | | |
| P4 | | | | | |
| P5 | ○ | ○ | ○ | ○ | ○ | M(W) RP
| P6 | | | | | |
| P7 | | | | | |
| P8 | ○ | ○ | ○ | ○ | ○ | M(E) RP
| P9 | | | | | |
| P10 | | ○ | ○ | | |
| P11 | | | | | |
| P12 | | | | | |

FIG. 6A

| B1 BRIDGE | | | | | |
|---|---|---|---|---|---|
| Ring ID | M(MVID=2), S1(S1VID=3) | | | | |
| VID / Port | 5 | 6 | 8 | 2 | 3 |
| P1 | ○ | ○ | ○ | | |
| P2 | ○ | ○ | | | |
| P3 | | | | | |
| P4 | | | | | |
| P5 | ○ | ○ | | | ○ | S1(W) RP
| P6 | | | ○ | | |
| P7 | ○ | | | | |
| P8 | ○ | ○ | ○ | ○ | ○ | M(W)/S1(E) RP
| P9 | | | | | |
| P10 | | | | | |
| P11 | ○ | ○ | ○ | ○ | ○ | M(E) RPL
| P12 | | ○ | | | |

FIG. 6B

| B2 BRIDGE | | | |
|---|---|---|---|
| Ring ID | S1(S1VID=3) | | |
| Port \ VID | 5 | 6 | 3 |
| P1 | | | |
| P2 | | | |
| P3 | | | |
| P4 | | ○ | |
| P5 | | | |
| P6 | | ○ | |
| P7 | | | |
| P8 | ○ | ○ | ○ | S1(W) RP
| P9 | | | |
| P10 | | | |
| P11 | ○ | ○ | ○ | S1(E) RPL
| P12 | | | |

FIG. 6C

| B5 BRIDGE | | | | | |
|---|---|---|---|---|---|
| Ring ID | M(MVID=2) | | | | |
| Port \ VID | 5 | 6 | 8 | 2 | 3 |
| P1 | | | | | |
| P2 | ○ | ○ | ○ | ○ | ○ | M(W) RP
| P3 | | | | | |
| P4 | | | | | |
| P5 | ○ | ○ | ○ | ○ | ○ | M(E) RP
| P6 | | | | | |
| P7 | | | | | |
| P8 | | ○ | | | |
| P9 | | | | | |
| P10 | | | | | |
| P11 | | | | | |
| P12 | | | | | |

FIG. 6D

| B4 BRIDGE | | | | | | |
|---|---|---|---|---|---|---|
| Ring ID | M(MVID=2),S1(S1VID=3) | | | | | |
| VID / Port | 5 | 6 | 8 | 2 | 3 | |
| P1 | | | | | | |
| P2 | ○ | ○ | ○ | ○ | ○ | M(E)/S1(W) RP |
| P3 | | | | | | |
| P4 | | | | | | |
| P5 | ○ | ○ | | | ○ | S1(E) RP |
| P6 | | | | | | |
| P7 | | | | | | |
| P8 | | | ○ | | | |
| P9 | | | | | | |
| P10 | | | | | | |
| P11 | ○ | ○ | ○ | ○ | ○ | M(W) RP |
| P12 | | ○ | | | | |

FIG. 6E

| B2 BRIDGE | | | | |
|---|---|---|---|---|
| Ring ID | S1(S1VID=3) | | | |
| VID / Port | 5 | 6 | 3 | |
| P1 | | | | |
| P2 | ○ | ○ | ○ | S1(E) RP |
| P3 | | | | |
| P4 | ○ | | | |
| P5 | | | | |
| P6 | ○ | | | |
| P7 | | | | |
| P8 | ○ | | | |
| P9 | | | | |
| P10 | | | | |
| P11 | ○ | ○ | ○ | S1(W) RPL |
| P12 | | | | |

FIG. 6F

METHOD FOR MANAGING ETHERNET RING NETWORK OF VLAN-BASED BRIDGE

CROSS-REFERENCE TO RELATED APPLICATIONS

This application claims the priority of Korean Patent Application No. 10-2009-0068077 filed on Jul. 24, 2009, in the Korean Intellectual Property Office, the disclosure of which is incorporated herein by reference.

BACKGROUND OF THE INVENTION

1. Field of the Invention

The present invention relates to a method for managing an Ethernet ring network of a VLAN-based bridge, and more particularly, to a technology for managing an Ethernet ring network for effectively registering a VLAN ID and updating a VLAN entry in a VLAN filtering database in order to operate Ethernet ring protection in an Ethernet bridge capable of recognizing a VLAN.

2. Description of the Related Art

An Ethernet ring network is constituted by Ethernet bridge nodes (hereinafter, referred to as 'ring nodes') providing a plurality of Ethernet ports. Two (one is East: hereinafter, referred to as 'E' and the other is West: hereinafter, referred to as 'W') of the Ethernet ports of each ring node are used to form a connection with an adjacent ring node and the rest of the ports are connected to an Ethernet network outside of the ring network. The number of ring ports of a node receiving a sub ring may be increased by one depending on the number of received sub rings.

In the Ethernet ring network, each of the ring nodes should create a filtering database table so as to prevent the delivery of an Ethernet frame from forming an infinite loop. Such loop prevention may be implemented by logically blocking one predetermined link called a ring protection link (RPL) in the Ethernet ring network. The Ethernet ring network has a ring protection link (RPL) owner node in order to provide such logical blocking. Herein, the delivery of the infinite loop of the ring is prevented by logically blocking an Ethernet port connected with the ring protection link among Ethernet ports of the ring protection link owner node. When both sides of the ring protection link need to be logically blocked, a node position at the opposite side to the ring protection link owner node of the ring protection link may be called a ring protection link (RPL) node.

Meanwhile, when a link failure occurs in the Ethernet ring network, the link with the failure provides physical blocking and when the link with the failure is blocked in order to prevent an error, the ring protection link owner node prevents the delivery of the infinite loop of the ring and connects all nodes that belong to the ring network by rapidly removing logical blocking. For the ring blocking and ring management, and state delivery, an R-APS message is used.

As such, in order to provide the Ethernet ring protection, the filtering database table should be created in order to prevent the delivery of a frame of each node from forming an infinite loop in the Ethernet ring. For this, by deactivating one link constituting the ring by blocking a predetermined link in the Ethernet ring, the corresponding link is processed as if it does not exist, thereby logically preventing the ring from being formed. Further, the delivery of the infinite loop is prevented by creating a delivery table in each node in accordance with a source address learning method used in a general Ethernet MAC (Media Access Control) mechanism. Herein, the blocked link is just logically designated and a physical link exists. Therefore, traffic can be delivered immediately by removing the logical blocking.

The technology related to the Ethernet ring protection is actively being developed at present. Specifically, the technology may relate to a protection operation process of an ERP (Ethernet Ring Protection) controller for Ethernet protection and a direct signaling technology of an R-APS frame.

However, a method for configuring an Ethernet ring network topology in an Ethernet bridge capable of recognizing a VLAN in order to implement the Ethernet ring protection technology, and a management method related to registration of a VLAN ID and the updating of a VLAN entry in a VLAN filtering database, which is required to operate the ERP controller, do not exist.

SUMMARY OF THE INVENTION

An aspect of the present invention provides a method for managing an Ethernet ring network of a VLAN-based bridge for effectively registering a VLAN ID and updating a VLAN entry in a VLAN filtering database in order to operate Ethernet ring protection in an Ethernet bridge capable of recognizing a VLAN.

According to an aspect of the present invention, there is provided a method for managing an Ethernet ring network of a VLAN-based bridge, including: registering a major-ring VID (VLAN ID) in a ring port filtering database of a ring protection link owner node in accordance with a request for registering the major ring VID (VLAN ID) from an ERP (Ethernet Ring Protection) controller mounted on the ring protection link owner node of a major ring; delivering, by the ring protection link owner node, a VID registration message to other nodes which belong to the major ring through a ring port; receiving the VID registration message through the ring port and registering the major ring VID in a ring port filtering database of each node itself, by each node which belongs to the major ring; and delivering, by each node which belongs to the major ring, the VID registration message to other nodes which belong to the major ring through the ring port.

The method further includes: when a VID requiring an ERP service among VIDs registered in each node which belongs to the major ring exists, requesting, by an ERP controller of a node in which the VID requiring the ERP service is registered, registration of the VID; registering the VID in a ring port filtering database of the node in which the VID requiring the ERP service is registered; delivering, by the node in which the VID requiring the ERP service is registered, a VID registration message to other nodes which belong to the major ring through the ring port; receiving the VID registration message through the ring port and registering the VID in the ring port filtering database of the each node itself, by the each node which belongs to the major ring; and delivering, by each node which belongs to the major ring, the VID registration message to other nodes which belong to the major ring through the ring port.

Herein, when each node which belongs to the major ring receives the VID registration message sent by each node itself, registration of the major ring VID or the VID in all ring port filtering databases of each node which belongs to the major ring is completed.

The method further includes, when a node which belongs to the major ring receives a new VID registration message within a predetermined time after registration of the major ring VID or the VID is completed, determining whether or not the VID requiring the ERP service among the VIDs registered in each node which belongs to the major ring exists and if the corresponding VID exists, performing the requesting, by the ERP controller of the node in which the VID requiring the ERP service is registered, registration of the VID.

On the contrary, the method further includes when each node which belongs to the major ring does not receive the new VID registration message within a predetermined time after registration of the major ring VID or the VID is completed, operating an ERP function. The method further includes, when registration of the new VID is needed in a node which belongs to the major ring after the ERP function is operated, determining whether or not the VID requiring the ERP service exists among the VIDs registered in each node which belongs to the major ring, and if the corresponding VID exists, performing the requesting, by the ERP controller of the node in which the VID requiring the ERP service is registered, registration of the VID.

The method further includes, when any one of flushing, blocking, and opening of the ring port is performed during ERP operation at the node which belongs to the major ring after the ERP function is operated, flushing, blocking, and opening both the VID requiring the ERP service among the VLAN services registered in the ring port and the major ring VID or the corresponding sub ring VID.

According to another aspect of the present invention, there is provided a method for managing an Ethernet ring network of a VLAN-based bridge, including: registering a sub-ring VID (VLAN ID) in a ring port filtering database of a ring protection link owner node in accordance with a request for registering the sub ring VID (VLAN ID) from an ERP (Ethernet Ring Protection) controller mounted on the ring protection link owner node of a sub ring; delivering, by the ring protection link owner node, a VID registration message to other nodes which belong to the sub ring and major ring through a ring port; receiving the VID registration message through the ring port and registering the sub ring VID in a ring port filtering database of each node itself, by each node which belongs to the sub ring and major ring; and delivering, by each node which belongs to the sub ring and major ring, the VID registration message to other nodes which belong to the sub ring and major ring through the ring port.

The method further includes: when a VID requiring an ERP service among VIDs registered in a node of the sub ring exists, requesting, by an ERP controller of a node in which the VID requiring the ERP service is registered, registration of the VID; registering the VID in a ring port filtering database of the node in which the VID requiring the ERP service is registered; delivering, by the node in which the VID requiring the ERP service is registered, a VID registration message to other nodes which belong to the sub ring and major ring through the ring port; receiving the VID registration message through the ring port and registering the VID in the ring port filtering database of the each node itself, by each node which belongs to the sub ring and major ring; and delivering, by each node which belongs to the sub ring and major ring, the VID registration message to other nodes which belong to the sub ring and major ring through the ring port.

When each node which belongs to the sub ring receives the VID registration message sent by each node itself, registration of the sub ring VID or the VID in all ring port filtering databases of each node which belongs to the sub ring and major ring is completed.

When a node which belongs to the sub ring receives a new VID registration message within a predetermined time after registration of the sub ring VID or the VID is completed, determining whether or not the VID requiring the ERP service among the VIDs registered in the node of the sub ring exists and if the corresponding VID exists, performing the requesting, by the ERP controller of the node in which the VID requiring the ERP service, registration of the VID.

On the contrary, the method further includes when each node which belongs to the sub ring does not receive the new VID registration message within a predetermined time after registration of the sub ring VID or the VID is completed, operating an ERP function. The method further includes, when registration of the new VID is needed in a node which belongs to the sub ring after the ERP function is operated, determining whether or not the VID requiring the ERP service exists among the VIDs registered in the node of the sub ring and if the corresponding VID exists, performing the requesting, by the ERP controller of the node in which the VID requiring the ERP service is registered, registration of the VID.

The method further includes when any one of flushing, blocking, and opening of the ring port is performed during ERP operation at the node which belongs to the sub ring after the ERP function is operated, flushing, blocking, and opening both the VID requiring the ERP service among the VLAN services registered in the ring port and the major ring VID or the corresponding sub ring VID.

According to still another aspect of the present invention, there is provided a method for managing an Ethernet ring network of a VLAN-based bridge, including: setting a ring ID (M, Sn) for each ring, declaring ports constituting each ring as a ring port, and setting a direction of a ring port of each of nodes constituting each ring; determining a ring protection link owner node and a ring protection link node by declaring a ring protection link for each ring; setting a major ring VID (VLAN ID) and a sub-ring VID (VLAN ID) for the delivery of an R-APS message and ring management and registering the major-ring VID and the sub-ring VID in forwarding databases of ring ports of the major ring; and updating an VID to which an ERP (Ethernet Ring Protection) function is applied among VIDs registered in forwarding database entries of all ring ports.

The updating of the VID further includes: registering all VIDs to which the ERP function is applied in the major ring in forwarding databases of all ring ports of nodes constituting the major ring; and registering all VIDs to which the ERP function is applied in the sub ring in forwarding databases of all ring ports of nodes constituting the sub ring and major ring. The updating of the VID includes when another lower sub ring is hierarchically provided in the sub ring, registering all VIDs in the lower sub ring in forwarding databases of all ring ports of nodes constituting the lower sub ring and the sub ring.

At the updating of the VID, when a ring port is changed, VIDs related to the ring port are configured by grouping entries including VIDs of the ring port so as to flush, block, and open items of filtering databases related to all VIDs in the ring port at the same time.

The method further includes when any one of flushing, blocking and opening of the ring port during ERP operation is performed at the nodes which belong to the major ring and the sub ring, flushing, blocking, and opening both a VID requiring an ERP service among the VLAN services registered in the ring port and the major-ring VID or the corresponding sub-ring VID.

BRIEF DESCRIPTION OF THE DRAWINGS

The above and other aspects, features and other advantages of the present invention will be more clearly understood from the following detailed description taken in conjunction with the accompanying drawings, in which:

FIG. 2B is a diagram showing set-up of VID of filtering databases of 6 bridges constituting a physical ring in an Ethernet network shown in FIGS. 1A and 1B;

FIGS. 6A to 6F are diagrams showing a filtering database updated by a method for managing an Ethernet ring network of a VLAN-based bridge for applying Ethernet ring protection according to an exemplary embodiment of the present invention.

DETAILED DESCRIPTION OF THE PREFERRED EMBODIMENT

Figure 1A:
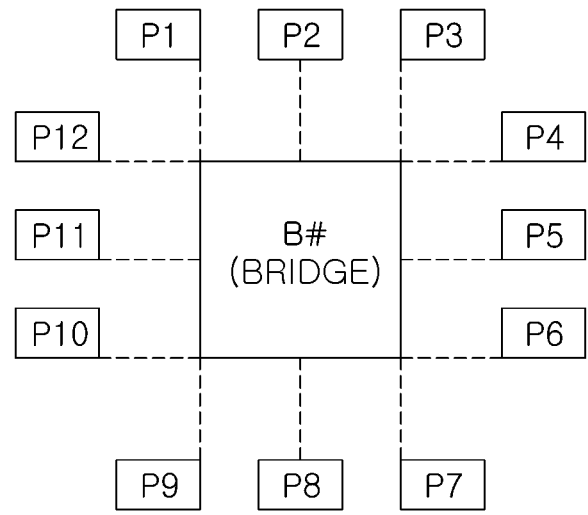
FIGS. 1A and 1B are diagrams showing one example of an Ethernet network adopting a VLAN.
Figure 1A:
Figure 1A:

Hereinafter, exemplary embodiments of the present invention will be described in detail with reference to the accompanying drawings, which will fully convey the concept of the invention to those skilled in the art. Moreover, detailed descriptions related to well-known functions or configurations will be ruled out in order not to unnecessarily obscure the subject matter of the present invention. It is also noted that like reference numerals denote like elements in appreciating the drawings.

Recognizing a VLAN, and registering and processing a VLAN ID are generally called VIDs of S-Tag (S-VID), B-Tag (B-VID), and I-Tag (I-SID) frames in addition to a C-Tag (C-VID) frame of a basic VLAN-based service. Further, the registering and processing the VLAN ID according to the present invention may be also applied to an ID of an MPLS label in the same manner as above and, in the present invention, it is briefly called a VLAN ID, that is, a VID.

Further, a bridge described in the present invention includes an Ethernet bridge based on IEEE 802.1D and a provider bridge (PB), a provider backbone bridge (PBB), and a provisioned provider backbone bridge (PBB-TE or PBT) adopting traffic engineering, acquired by the Ethernet bridge based on IEEE 802.1D. Furthermore, bridge function processing may be applied similarly, even to a switch providing MPLS label switching, and in the present invention it is briefly called a bridge.

Further, a filtering database described in the present invention includes a table including an address and other attributes required to perform a bridge function and a switch function in addition to a filtering database of the Ethernet bridge having entry attributes such as an MAC address, a VID, and the like.

First, prior to describing the present invention, Ethernet ring protection will be briefly described.

Figure 1B:
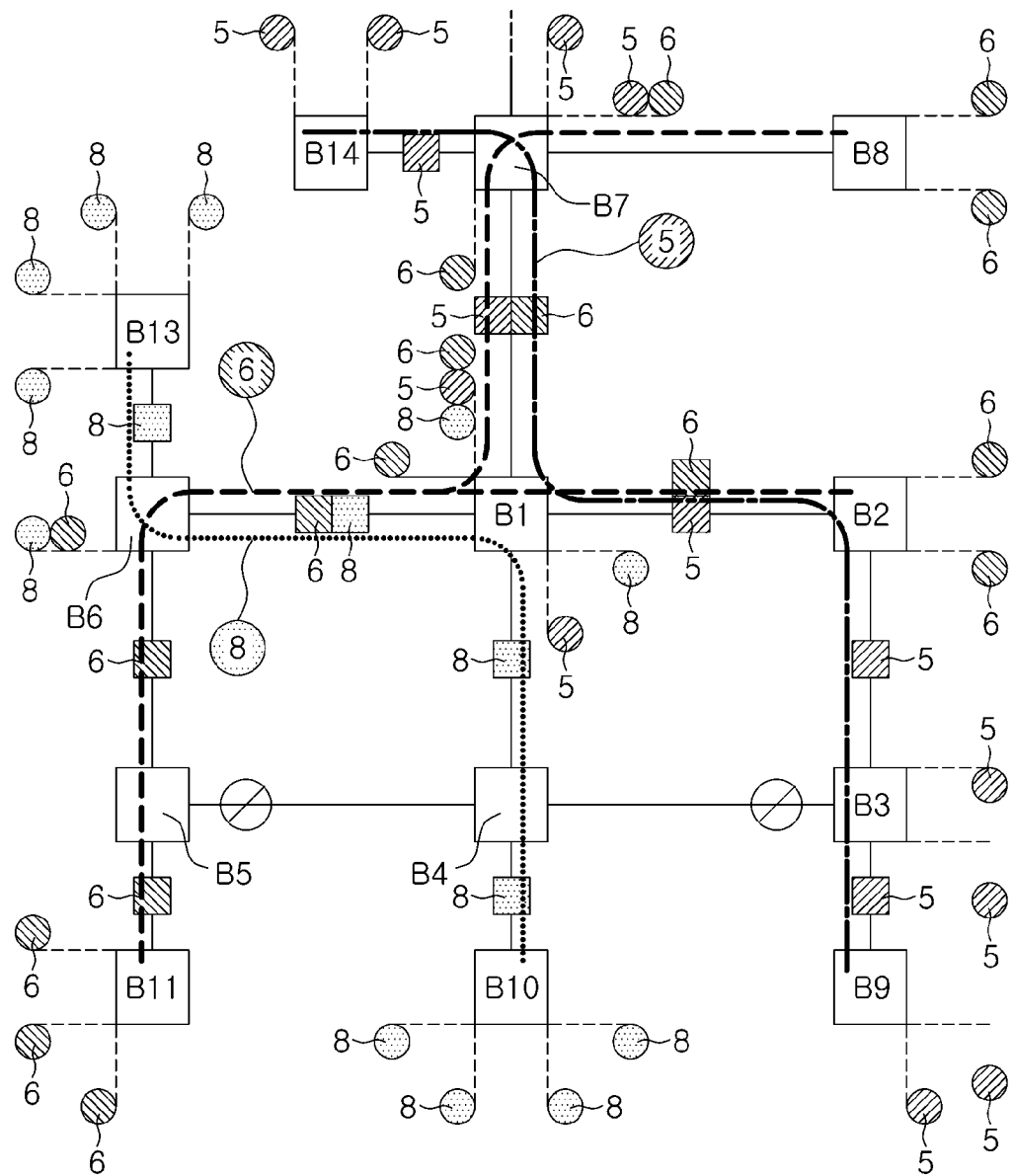

FIGS. 1A and 1B are diagrams showing one example of an Ethernet network adopting a VLAN. Specifically, FIGS. 1A and 1B are an example of a VLAN network topology through a virtual LAN (VLAN) at an Ethernet bridge capable of recognizing a basic VLAN (supporting an IEEE 802.1Q service). Herein, B1 to B14 are bridges capable of recognizing the VLAN and each bridge includes 12 ports, P1 to P12. For convenience of description, it is assumed that ports P2, P5, P8, and P11 of the bridge are links connected between the bridges and the rest of the ports are ports connected with a terminal.

Most Ethernet networks are configured in a physical ring form by full mesh connection. However, when the Ethernet network is configured in the form of a loop or a ring, frames are flooded, and, as a result, the traffic is flooded in the network. Accordingly, in order to solve the problem, the network should be statically designed not to generate a loop, or the loop should be prevented from being generated by using a protocol such as a spanning tree protocol (STP).

Meanwhile, in order to configure a virtual LAN (VLAN) network, unnecessary frame delivery is prevented by registering a VID in a filtering database entry of each port at each end terminal and each bridge. At this time, at each port, a plurality of VIDs may be registered depending on a VLAN region to which each port belongs.

A static VLAN registration entry for a VLAN operator itself to statically set a VLAN network and a dynamic VLAN entry to be dynamically updated by adopting a GVRP (GVRP VLAN Registration Protocol) or an MVRP (Multiple VLAN Registration Protocol) are included in the filtering database. "Default PVID=1" which is a basic VLAN is set in the static VLAN registration entry.

FIG. 1A shows VIDs registered in a filtering database of each receiving side (a receiving unit of an end terminal and a receiving end of a bridge port) of a link connected between an end terminal port and the bridge port. Further, FIG. 1B shows an Ethernet network adopting the VIDs registered in the filtering database.

In FIGS. 1A and 1B, three VLANs having VIDs of 5, 6, and 8 are provided and the corresponding VID should be registered in a receiving-end filtering database entry of each bridge for each VLAN service.

For example, in FIG. 1B, in the case of bridge B1, the VIDs of 5, 6, and 8 should be registered in a receiving-end filtering database entry of port P1 for the VLAN service, the VIDs of 5 and 6 should be registered in the entry of port P2, the VIDs of 5 and 6 in the entry of port P5, the VID of 8 should be registered in the entry of port P6, the VID of 5 should be registered in the entry of port P7, the VID 8 should be registered in the entry of port P8, the VIDs of 6 and 8 should be registered in the entry of port P11, and the VID of 6 should be registered in the entry of port P12.

Further, in the case of the end terminal connected to B1 (P1) in FIG. 1B, three VLANs can be accessed only when the VIDs of 5, 6, and 8 are registered in the entry of the filtering database of the receiving port.

Figure 2A:
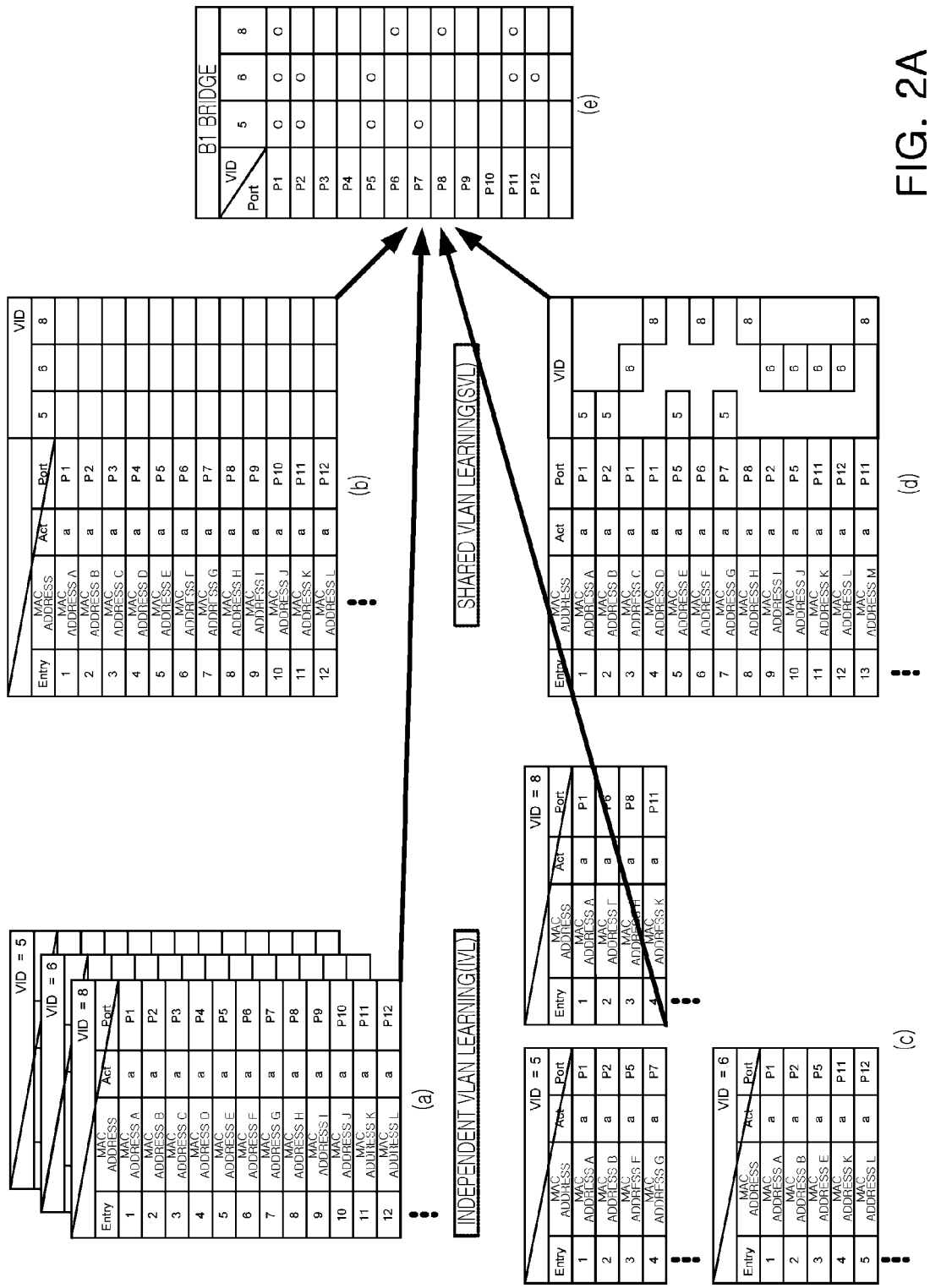
FIG. 2A is a diagram showing an example in which a general filtering database of an Ethernet network and a table summarizing the general filtering database are configured.

FIG. 2A is a diagram showing an example in which a general filtering database of an Ethernet network and a table summarizing the general filtering database are configured and FIG. 2B is a diagram showing a set-up of VID of filtering databases of 6 bridges constituting a physical ring in an Ethernet network shown in FIGS. 1A and 1B.

The filtering database is classified into a static VLAN registration entry and a dynamic VLAN registration entry in accordance with the registration method. Further, the filtering database is classified into an independent VLAN learning (IVL) filtering database and a shared VLAN learning (SVL) filtering database in accordance with a VID management type.

The independent VLAN learning filtering database represents a method for managing the filtering database independently for each VID as shown in FIG. 2A(a) and the shared VLAN learning filtering database is a method for managing all VIDs by using one filtering database as shown in FIG. 2A(b). Both methods may be alternately.

FIG. 2A(c) shows setting the VID in the independent VLAN learning filtering database for bridge B1 and FIG. 2A(d) shows setting the VID in the shared VLAN learning filtering database.

In the present invention, setting the filtering database entry in the VID registration method of the Ethernet ring protection is summarized as shown in FIG. 2A(e).

Figure 3A:
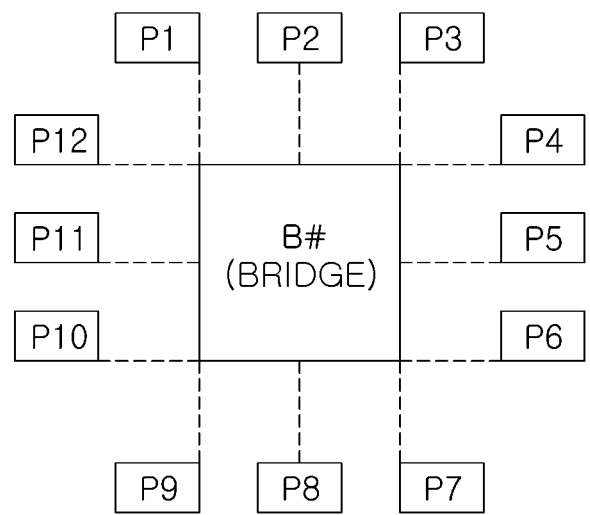
FIGS. 3A and 3B are diagrams showing one example in which an existing logical tree structure is converted into a logical ring structure by applying Ethernet ring protection to a VLAN tree type network structure according to an exemplary embodiment of the present invention.
Figure 3A:
Figure 3B:
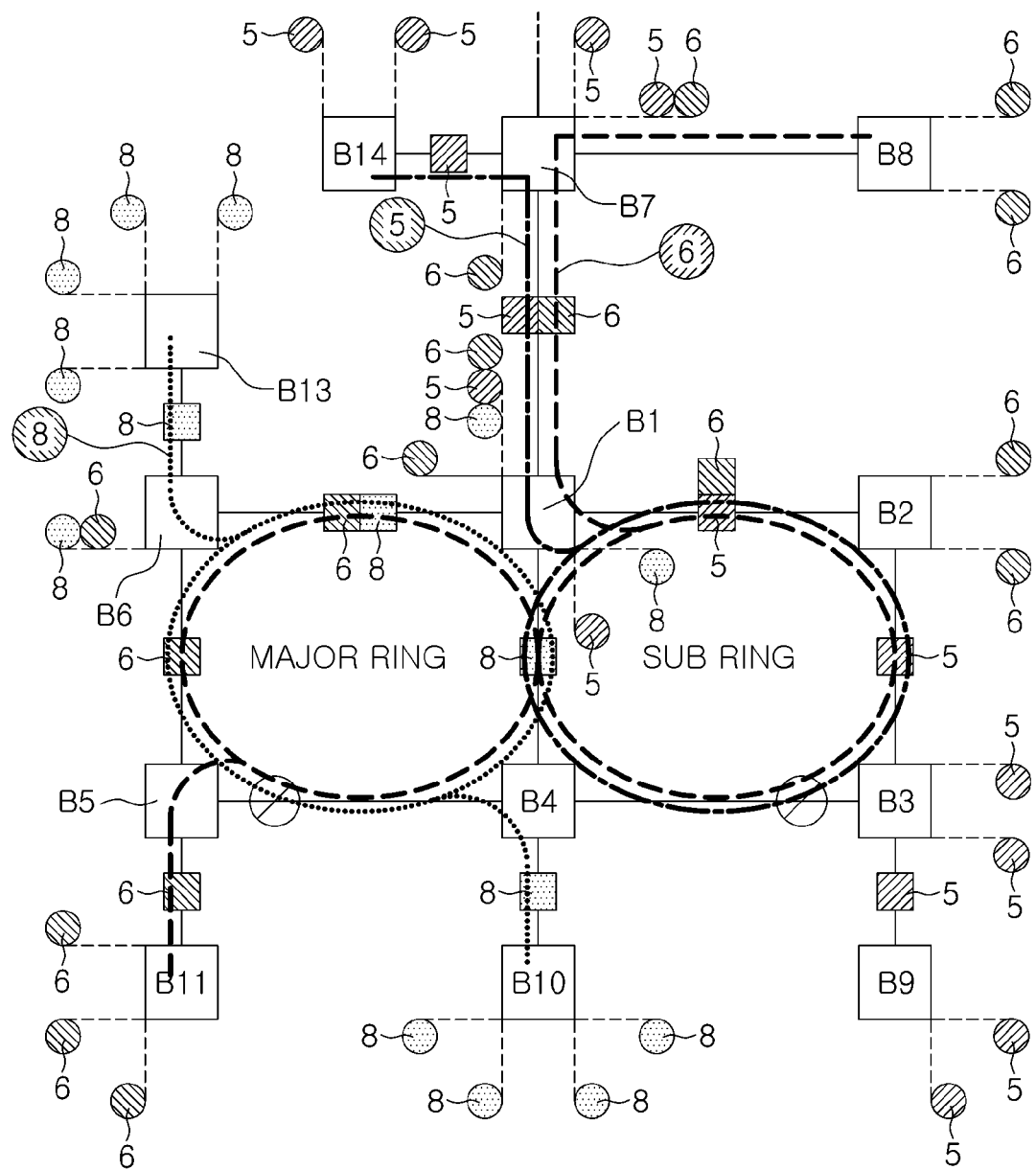

FIGS. 3A and 3B are diagrams showing one example in which an existing logical tree structure is converted into a logical ring structure by applying Ethernet ring protection to a VLAN tree type network structure according to an exemplary embodiment of the present invention, and shows a ring structure in which a major ring is formed and a sub ring is formed to the right side of the major ring.

In the VLAN tree type network structure shown in FIGS. 1A and 1B, the filtering database entry and the VID set-up should be updated as proposed in the present invention in order to apply the Ethernet ring protection (ERP) technology as shown in FIGS. 3A and 3B.

First, a case in which the VLAN ID is statically registered in the static VLAN registration entry or the VLAN entry is updated by a user in a manual method or a provisioned method will be described.

A ring ID (M, S1) is set for each ring, ports constituting the ring are declared as a ring port (RP), and directions (East and West) of two ring ports of each of nodes constituting the ring are set.

For example, in FIG. 3B, ring ports of the major ring include B1(E:P11, W:P8), B4(E:P2, W:P11), B5(E:P5, W:P2), and B6(E:P8, W:P5) and ring ports of the sub ring include B2(E:P11, W: P8), B3(E:P2, W:P11), B4(E:P5, W:P2), and B1(E:P8, W:P5).

Thereafter, a ring protection link owner node and a ring protection link node are determined by declaring a ring protection link which is located at a position to be blocked by an ERP controller for each ring.

For example, in FIG. 3B, B1(E:P11) is declared as the ring protection link of the major ring and B2(E:P11) is declared as the ring protection link of the sub ring.

Thereafter, a predetermined VID (M=2: hereinafter, referred to as 'MVID', S1=3: hereinafter, referred to as 'S1VID') for the delivery of an R-APS message and ring management is set and the MVID and S1VID are registered in corresponding ring ports of the major ring. At this time, the predetermined VID may be set as a VID (MVID=8, S1VID=5) which uniquely exists in each ring of an ERP ring network among VIDs that already exist in a topology, but it is efficient to increasing the priority rather than other traffic VIDs by setting the predetermined VID to other VIDs in order to improve the performance of protection.

A forwarding database entry of the ring port is updated in order to update all VIDs to which the Ethernet ring protection will be applied by applying an ERP function among VIDs registered in forwarding database entries of all ports constituting each ring.

At this time, in a multiple ring structure, all VIDs in the major ring to which the ERP function will be applied in the major ring are registered in forwarding databases of all ring ports of the nodes constituting the major ring. For example, in FIG. 3B, a VLAN service having the VIDs of 5, 6, and 8 is registered in the forwarding databases of all major ring ports.

Figure 4A:
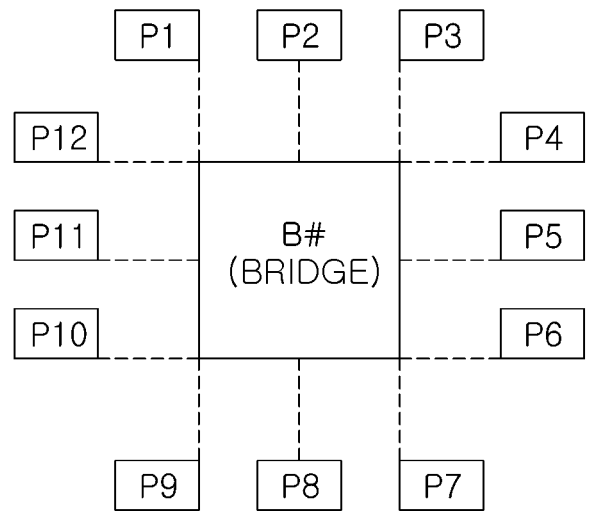
FIGS. 4A and 4B are diagrams showing one example of a change of a network topology of a major ring and a change of filtering database set-up of a ring port by a method for managing an Ethernet ring network of a VLAN-based bridge for applying Ethernet ring protection according to an exemplary embodiment of the present invention.
Figure 4A:
Figure 4A:
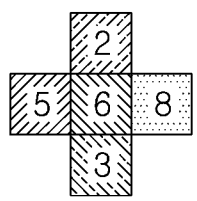
Figure 4B:
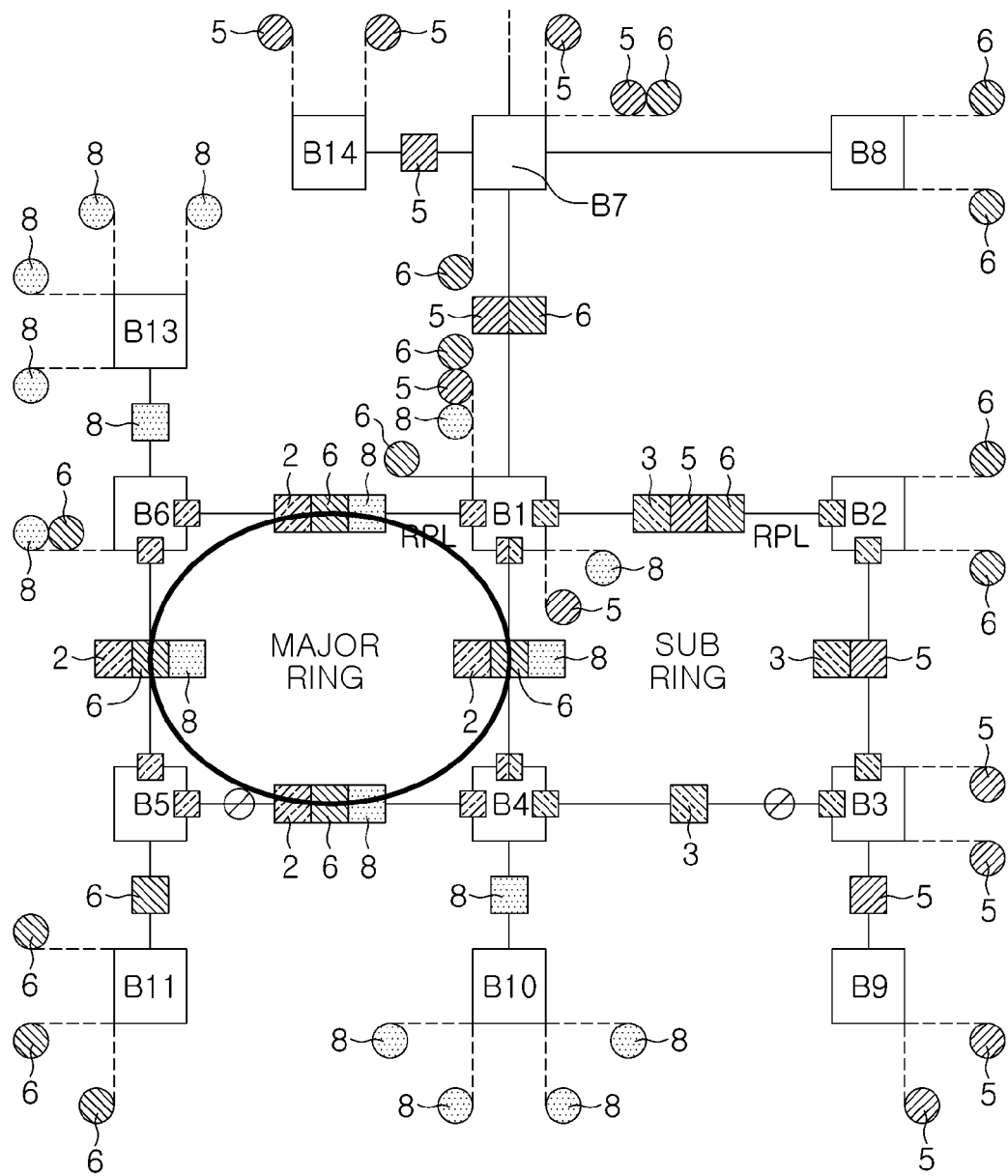

FIGS. 4A and 4B are diagrams showing one example of a change of a network topology of a major ring and a change of filtering database set-up of a ring port by a method for managing an Ethernet ring network of a VLAN-based bridge for applying Ethernet ring protection according to an exemplary embodiment of the present invention.

Specifically, FIGS. 4A and 4B show an Ethernet ring network in which predetermined VIDs are registered for the delivery of the R-APS message and the ring management, the ports B1(E:P11, W:P8), B4(E:P2, W:P11), B5(E:P5, W:P2), and B6(E:P8, W:P5) of the major ring are registered, the ports B2(E:P11, W:P8), B3(E:P2, W:P11), B4(E:P5, W:P2), and B1(E:P8, W:P5) of the sub ring are registered, all VLAN services (VIDs) to which the ERP function will be applied in the major ring, VID=6 and VID=8, are registered in the ports of the major ring, B1(E:P11), B1(W:P8), B4(E:P2), B4(W:P11), B5(E:P5), B5(W:P2), B6(E:P8), and B6(W:P5).

In the case of registration of the filtering database of the sub ring in the multiple ring structure, all VLAN services (VIDs) in the sub ring to which the ERP function will be applied in the sub ring should be registered in forwarding databases in all the ring ports of each node of the sub ring and each node of the major ring.

Figure 5A:
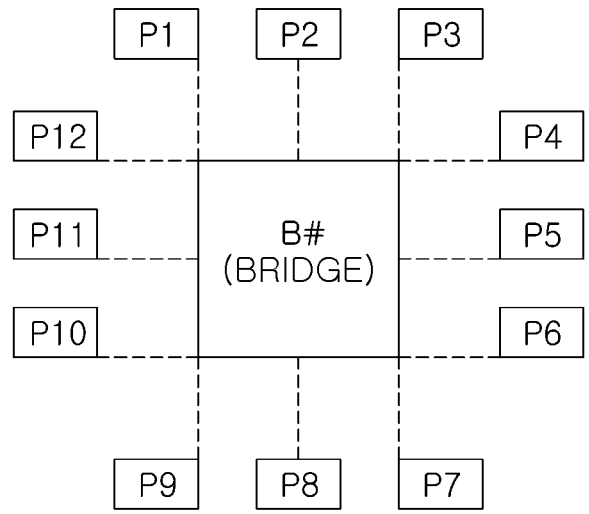
FIGS. 5A and 5B are diagrams showing one example of a change of an entire network topology and a change of filtering database set-up of a ring port by a method for managing an Ethernet ring network of a VLAN-based bridge for applying Ethernet ring protection according to an exemplary embodiment of the present invention.
Figure 5A:
Figure 5A:
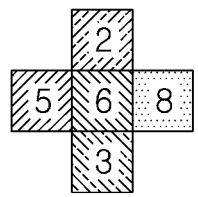
Figure 5B:
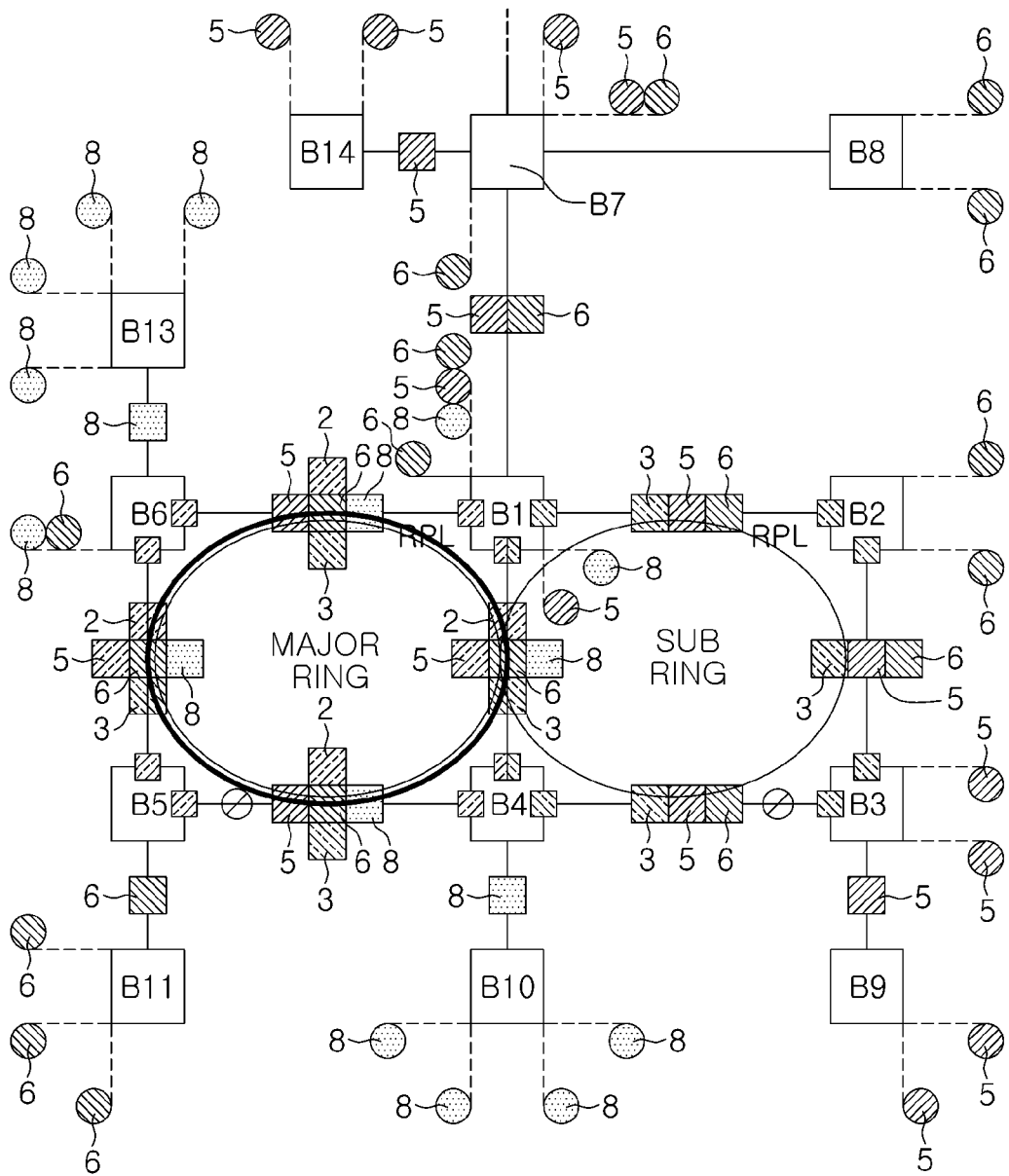

FIGS. 5A and 5B are diagram showing one example of a change of the topology of an entire network, and a change of a filtering database set-up of a ring port by a method for managing an Ethernet ring network of a VLAN-based bridge for applying Ethernet ring protection according to an exemplary embodiment of the present invention.

Specifically, FIGS. 5A and 5B show an Ethernet ring network in which all VLAN services (VIDs) to which the ERP function will be applied in the sub ring, VID=5 and VID=6, are registered in the ports B1(E:P11), B1(W:P8), B4(E:P2), B4(W:P11), B5(E:P5), B5(W:P2), B6(E:P8), and B6(W:P5) of the major ring and the ports B2(E:P11), B2(W:P8), B3(E:P2), B3(W:P11), B4(E:P5), B4(W:P2), B1(E:P8), and B1(W:P5) of the sub ring.

Although not shown in FIGS. 5A and 5B, even in the case of a plurality of sub rings, registration is processed in the same manner as described above. Further, even in the case in which another sub ring is hierarchically provided in the sub ring, registration is processed in the same manner as above. In other words, all VLAN services (VIDs) in a lower sub ring should be registered in the forwarding databases of all ring ports of each node in an upper ring rather than the lower sub ring in addition to each node in the corresponding lower sub ring.

FIGS. 6A to 6F are diagrams showing a filtering database updated by a method for managing an Ethernet ring network of a VLAN-based bridge for applying Ethernet ring protection according to an exemplary embodiment of the present invention.

When a failure occurs in any ring port, thus, the ring port is changed, VIDs related the ring port are configured by grouping entries including VIDs in the corresponding port as shown in FIGS. 6A to 6F so as to flush, block, and open items of filtering databases related to all VIDs (i.e., MVID and SnVID) in the ring port at the same time.

Figure 7A:
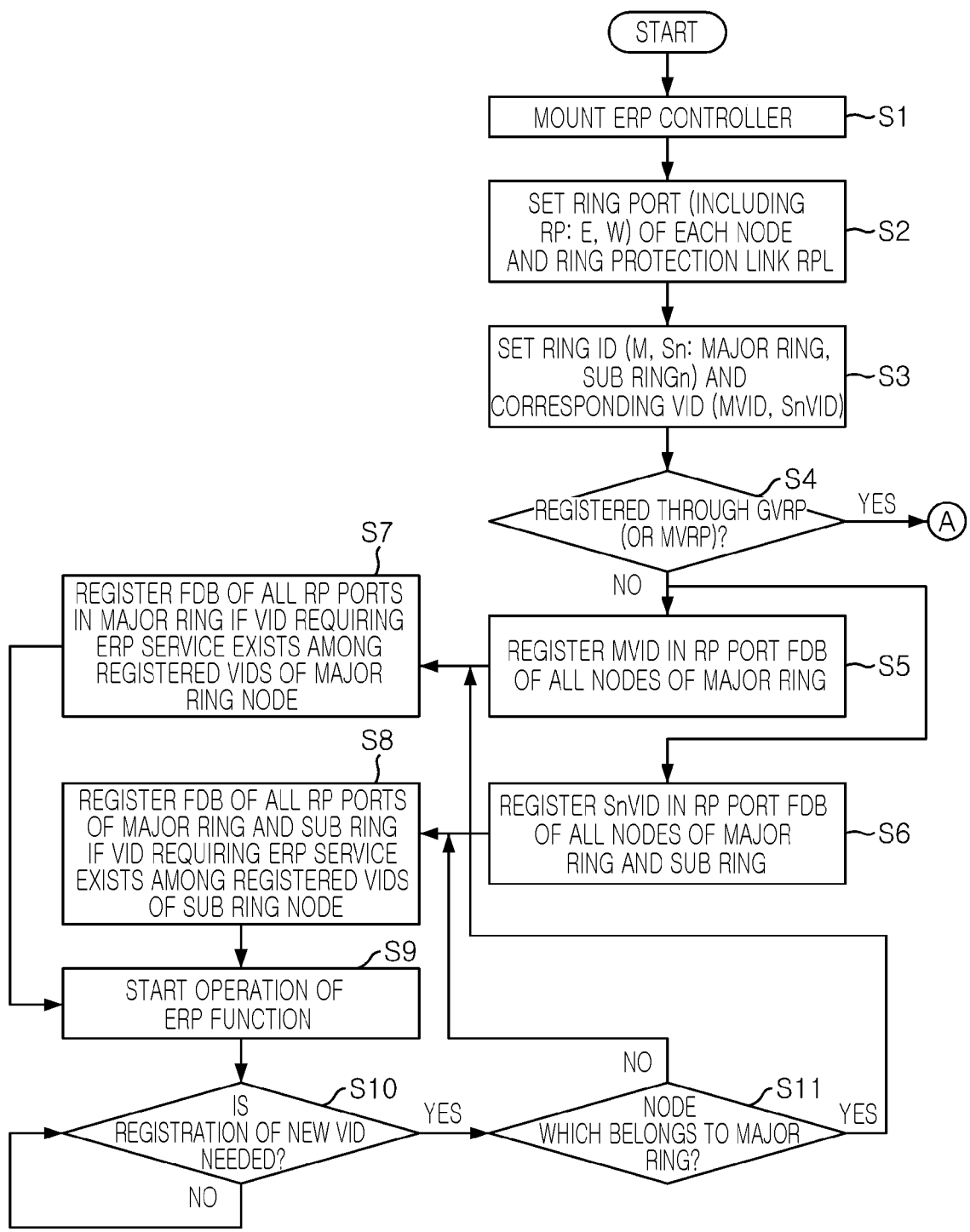
FIGS. 7A and 7B are flowcharts of a process of managing an Ethernet ring network of a VLAN-based bridge for applying Ethernet ring protection according to an exemplary embodiment of the present invention.
Figure 7B:
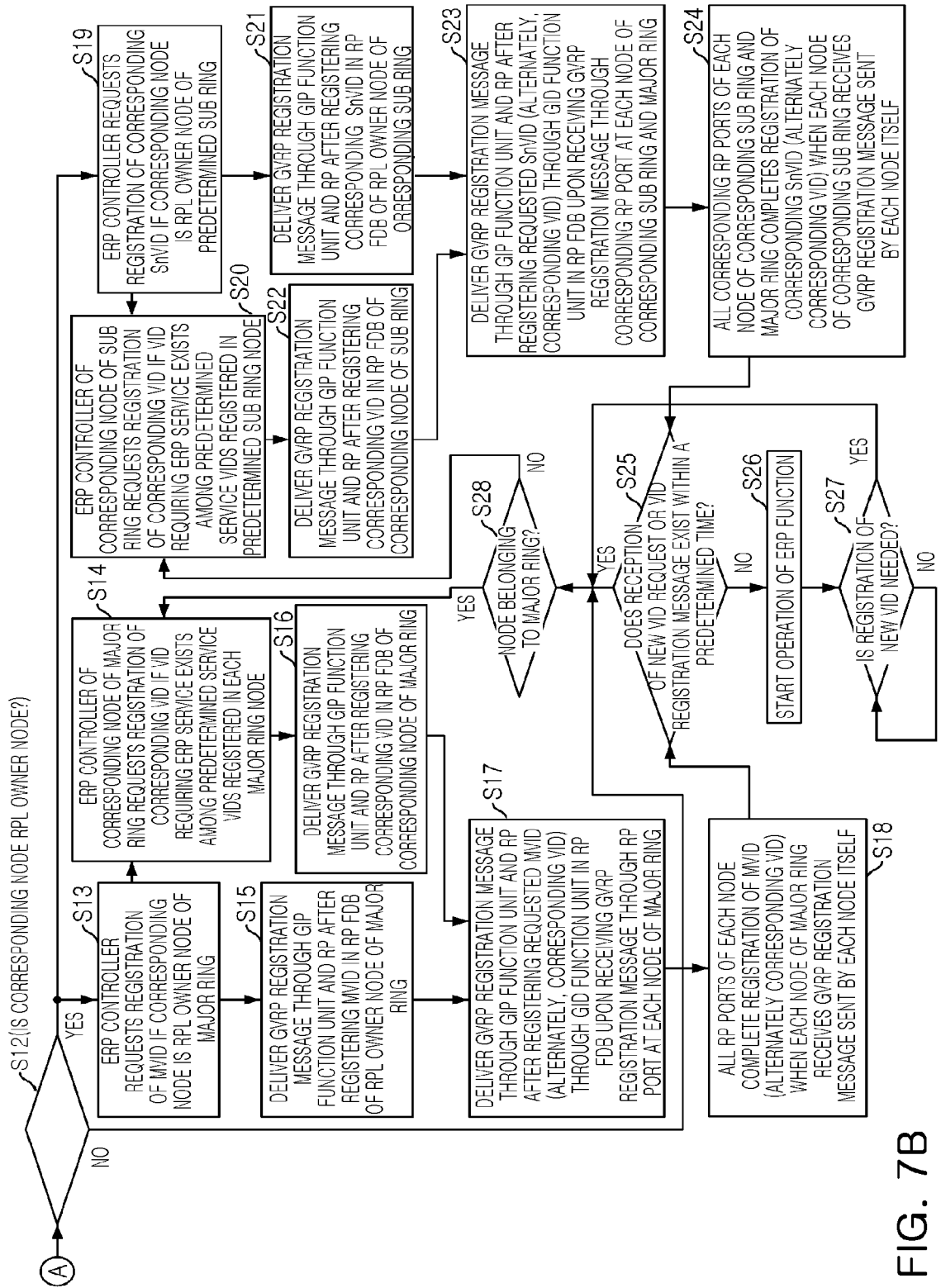

FIGS. 7A and 7B are flowcharts of a process of managing an Ethernet ring network of a VLAN-based bridge for applying Ethernet ring protection according to an exemplary embodiment of the present invention. FIGS. 7A and 7B show the above-mentioned static registration process and a process of dynamically registering the VLAN ID and updating the VLAN entry in the dynamic VLAN registration entry by using GVRP or MVRP, in detail.

First, the ERP controller for Ethernet ring protection is mounted (S1).

Thereafter, ports constituting a ring at each ring node are declared as a ring port, directions of two ring ports are set to East and West, and a ring protection link which is located at a position to be blocked by the ERP controller is set for each ring (S2).

Then, a ring ID (M, S1) of each ring is set and the corresponding VID is set (S3).

Next, registration using the GVRP or MVRP or not is determined (S4) and when the registration uses the GVRP or MVRP, the process proceeds to A of FIG. 7B and otherwise, the VLAN ID is statically registered or the VLAN entry is updated as described above.

Specifically, if the registration does not use the GVRP or MVRP, the MVID is registered in ring port filtering databases of all nodes in a major ring (S5) and when a VID requiring an ERP service exists among the VIDs registered in the major ring node, the corresponding VID is registered in all ring port filtering databases of the major ring (S7).

At the same time, SnVID is registered in ring port filtering databases of all nodes of the major ring and a sub ring (S6) and when the VID requiring the ERP service exists among the VIDs registered in the sub ring node, the corresponding VID is registered in the all ring port filtering databases of the major ring and the sub ring (S8).

When registration of the VID requiring the ERP service is completed, operation of an ERP function is started (S9) and it is periodically determined whether or not registration of a new VID is needed (S10). If registration of the new VID is needed, the process proceeds to step S7 in the case of a node that belongs to the major ring (S11) and otherwise, the process proceeds to step S8 and the above steps are repetitively performed.

Meanwhile, referring to FIG. 7B, if the registration uses the GVRP or MVRP, it is first determined whether or not the corresponding node is a ring protection link owner node (S12).

If the corresponding node is the ring protection link owner node of the major ring, the ERP controller mounted on the corresponding node requests the registration of MVID by making a GVRP frame transmission request (GID_Join.request) (S13). At this time, the MVID is registered in a ring port filtering database of the corresponding node and thereafter, a GVRP registration message is delivered to another node through the ring port by using a GIP (GARP Information Propagation) function unit (S15).

Meanwhile, if the VID requiring the ERP service among predetermined VLAN services registered in each major ring node exists, the ERP controller of the corresponding node of the major ring requests registration of the corresponding VID (S14) and as a result, the corresponding VID is registered in the ring port filtering database of the corresponding node of the major ring and thereafter, the GVRP registration message is delivered to another node through the ring port by using the GIP function unit (S16).

Thereafter, as the GVRP registration message is received through the ring port at each node of the major ring, the corresponding MVID or the corresponding VID is registered in the ring port filtering database of the corresponding node by using a GID (GARP Information Declaration) function unit and thereafter, the GVRP registration message is delivered to another node through the ring port by using the GIP function unit (S17).

When each node of the major ring receives the GVRP registration message sent by itself, registration of the MVID or VID in all ring ports of each node is completed (S18).

If the corresponding node is the ring protection link owner node of the sub ring, the ERP controller mounted on the corresponding node requests registration of SnVID by making the GVRP frame transmission request (GID_Join.request) (S19). At this time, the SnVID is registered in a ring port filtering database of the corresponding node and thereafter, the GVRP registration message is delivered to another node through the ring port by using the GIP function unit (S21).

Meanwhile, if the VID requiring the ERP service among predetermined VLAN services registered in a predetermined sub ring node exists, the ERP controller of the corresponding node of the sub ring requests registration of the corresponding VID (S20) and as a result, the corresponding VID is registered in the ring port filtering database of the corresponding node of the sub ring and thereafter, the GVRP registration message is delivered to another node through the ring port by using the GIP function unit (S22).

Thereafter, as the GVRP registration message is received through the ring port at each node of the corresponding sub ring and major ring, the corresponding SnVID or the corresponding VID is registered in the ring port filtering database of the corresponding node by using the GID function unit and thereafter, the GVRP registration message is delivered to another node through the ring port by using the GIP function unit (S23).

When each node of the corresponding sub ring receives the GVRP registration message sent by itself, registration of the SnVID or VID in all ring ports of each node of the corresponding sub ring and major ring is completed (S24).

Thereafter, it is determined whether a new VID request or VID registration message is received within a predetermined time (S25) and if the new VID request or VID registration message is received, the process proceeds to step S14 in the case of a node that belongs to the major ring and otherwise, the process proceeds to step S20 and the above-mentioned steps are repetitively performed.

On the contrary, if the new VID request or VID registration message is not received within a predetermined time, an operation of the ERP function is started (S26) and it is periodically determined whether or not registration of a new VID is needed (S27), and if registration of the new VID is needed, the process proceeds to step S14 or S20 depending on the node that belongs to the major ring or not (S28) and thus, the above-mentioned steps are repetitively performed.

By the above-mentioned procedure, when the operation of the ERP function is started after registration of the VID requiring the ERP service among the predetermined VLAN services in the major ring and the sub ring is completed, the VID and MVID or SnVID requiring the ERP service among the predetermined VLAN services registered in the corresponding port are flushed, blocked, and opened while the ring port is flushed, blocked, and opened during ERP operation at the nodes of each of the major ring and the sub ring, as a result, a ring protection function for a predetermined VLAN service may be performed.

All the operations should be performed before operation of the ERP function of the ERP controller is started. During the process, the physical blocking or blocking for preventing loop of the Ethernet network configured by using an STP protocol is maintained as it is and the tree type network topology should also be maintained.

As set forth above, according to an exemplary embodiment of the present invention, an Ethernet ring protection technology can be applied to a VLAN-based Ethernet ring network by effectively converting a VLAN network topology into a VLAN topology suitable for Ethernet ring protection.

While the present invention has been shown and described in connection with the exemplary embodiments, it will be apparent to those skilled in the art that modifications and variations can be made without departing from the spirit and scope of the invention as defined by the appended claims.

What is claimed is:

1. A method for managing an Ethernet ring network of a VLAN-based bridge, comprising:

registering a major-ring VID (VLAN ID) in a ring port filtering database of a ring protection link owner node in accordance with a request for registering the major ring VID (VLAN ID) from an ERP (Ethernet Ring Protection) controller mounted on the ring protection link owner node of a major ring;

delivering, by the ring protection link owner node, a VID registration message to other nodes which belong to the major ring through a ring port;

receiving the VID registration message through the ring port and registering the major ring VID in a ring port filtering database of each node itself, by each node which belongs to the major ring;

delivering, by each node which belongs to the major ring, the VID registration message to other nodes which belong to the major ring through the ring port; and when a VID requiring an ERP service among VIDs registered in each node which belongs to the major ring exists, requesting, by an ERP controller of a node in which the VID requiring the ERP service is registered, registration of the VID;

registering the VID in a ring port filtering database of the node in which the VID requiring the ERP service is registered;

delivering, by the node in which the VID requiring the ERP service is registered, a VID registration message to other nodes which belong to the major ring through the ring port;

receiving the VID registration message through the ring port and registering the VID in the ring port filtering database of the each node itself, by the each node which belongs to the major ring; and delivering, by each node which belongs to the major ring, the VID registration message to other nodes which belong to the major ring through the ring port.

2. The method for managing an Ethernet ring network of a VLAN-based bridge of claim 1, wherein when each node which belongs to the major ring receives the VID registration message sent by each node itself, registration of the major ring VID or the VID in all ring port filtering databases of each node which belongs to the major ring is completed.

3. The method for managing an Ethernet ring network of a VLAN-based bridge of claim 2, further comprising, when a node which belongs to the major ring receives a new VID registration message within a predetermined time after registration of the major ring VID or the VID is completed, determining whether or not the VID requiring the ERP service among the VIDs registered in each node which belongs to the major ring exists and if the corresponding VID exists, performing the requesting, by the ERP controller of the node in which the VID requiring the ERP service is registered, registration of the VID.

4. The method for managing an Ethernet ring network of a VLAN-based bridge of claim 2, further comprising, when each node which belongs to the major ring does not receive the new VID registration message within a predetermined time after registration of the major ring VID or the VID is completed, operating an ERP function.

5. The method for managing an Ethernet ring network of a VLAN-based bridge of claim 4, further comprising, when any one of flushing, blocking, and opening of the ring port is performed during ERP operation at the node which belongs to the major ring after the ERP function is operated, flushing, blocking, and opening both the VID requiring the ERP service among the VLAN services registered in the ring port and the major ring VID or the corresponding sub ring VID.

6. The method for managing an Ethernet ring network of a VLAN-based bridge of claim 4, further comprising, when registration of the new VID is needed in a node which belongs to the major ring after the ERP function is operated, determining whether or not the VID requiring the ERP service exists among the VIDs registered in each node which belongs to the major ring, and if the corresponding VID exists, performing the requesting, by the ERP controller of the node in which the VID requiring the ERP service is registered, registration of the VID.

7. A method for managing an Ethernet ring network of a VLAN-based bridge, comprising:

registering a sub-ring VID (VLAN ID) in a ring port filtering database of a ring protection link owner node in accordance with a request for registering the sub ring VID (VLAN ID) from an ERP (Ethernet Ring Protection) controller mounted on the ring protection link owner node of a sub ring;

delivering, by the ring protection link owner node, a VID registration message to other nodes which belong to the sub ring and major ring through a ring port;

receiving the VID registration message through the ring port and registering the sub ring VID in a ring port filtering database of each node itself, by each node which belongs to the sub ring and major ring;

delivering, by each node which belongs to the sub ring and major ring, the VID registration message to other nodes which belong to the sub ring and major ring through the ring port; and when a VID requiring an ERP service among VIDs registered in a node of the sub ring exists, requesting, by an ERP controller of a node in which the VID requiring the ERP service is registered, registration of the VID;

registering the VID in a ring port filtering database of the node in which the VID requiring the ERP service is registered;

delivering, by the node in which the VID requiring the ERP service is registered, a VID registration message to other nodes which belong to the sub ring and major ring through the ring port;

receiving the VID registration message through the ring port and registering the VID in the ring port filtering database of the each node itself, by each node which belongs to the sub ring and major ring; and delivering, by each node which belongs to the sub ring and major ring, the VID registration message to other nodes which belong to the sub ring and major ring through the ring port.

8. The method for managing an Ethernet ring network of a VLAN-based bridge of claim 7, wherein when each node which belongs to the sub ring receives the VID registration message sent by each node itself, registration of the sub ring VID or the VID in all ring port filtering databases of each node which belongs to the sub ring and major ring is completed.

9. The method for managing an Ethernet ring network of a VLAN-based bridge of claim 8, further comprising, when each node which belongs to the sub ring does not receive the new VID registration message within a predetermined time after registration of the sub ring VID or the VID is completed, operating an ERP function.

10. The method for managing an Ethernet ring network of a VLAN-based bridge of claim 9, further comprising, when registration of the new VID is needed in a node which belongs to the sub ring after the ERP function is operated, determining whether or not the VID requiring the ERP service exists among the VIDs registered in the node of the sub ring and if the corresponding VID exists, performing the requesting, by the ERP controller of the node in which the VID requiring the ERP service is registered, registration of the VID.

11. The method for managing an Ethernet ring network of a VLAN-based bridge of claim 9, further comprising, when any one of flushing, blocking, and opening of the ring port is performed during ERP operation at the node which belongs to the sub ring after the ERP function is operated, flushing, blocking, and opening both the VID requiring the ERP service among the VLAN services registered in the ring port and the major ring VID or the corresponding sub ring VID.

12. The method for managing an Ethernet ring network of a VLAN-based bridge of claim 8, further comprising, when a node which belongs to the sub ring receives a new VID registration message within a predetermined time after registration of the sub ring VID or the VID is completed, determining whether or not the VID requiring the ERP service among the VIDs registered in the node of the sub ring exists and if the corresponding VID exists, performing the requesting, by the ERP controller of the node in which the VID requiring the ERP service, registration of the VID.

13. A method for managing an Ethernet ring network of a VLAN-based bridge, comprising:

setting ring ports of an Ethernet ring node constituting an Ethernet ring, wherein a ring ID of the Ethernet ring is set;

determining whether the Ethernet ring node is a ring protection link (RPL) owner node or an RPL neighbor node, wherein an RPL is located between the RPL owner node and the RPL neighbor node;

registering VLAN IDs (VIDs) for performing a traffic channel blocking and a Ring Automatic Protection Switching (R-APS) channel blocking in Filtering Databases (FDBs) of the ring ports of the Ethernet ring node; and performing a topology update of the Filtering Databases;

wherein the performing of the topology update includes:

registering VIDs for performing the traffic channel blocking and the R-APS channel blocking in a major ring for which the Ethernet ring node constituting in the FDBs; and registering VIDs for performing the traffic channel blocking and the R-APS channel blocking in a sub ring, a lower Ethernet ring of the major ring, in the FDBs.

14. The method for managing an Ethernet ring network of a VLAN-based bridge of claim 13, wherein the registering of the VIDs includes:

registering VIDs for performing the traffic channel blocking and the R-APS channel blocking in a major ring for which the Ethernet ring node constituting, and in a sub ring, a lower Ethernet ring of the major ring, in the FDBs.

15. The method for managing an Ethernet ring network of a VLAN-based bridge of claim 13, wherein the performing the topology update includes:

when a status of a ring port is changed, blocking or unblocking the VIDs of the traffic channel and the R-APS channel of a subset of VLANs assigned for protection, related to the ring port.

16. The method for managing an Ethernet ring network of a VLAN-based bridge of claim 13, wherein the performing of the topology update includes:

when a status of a ring port is changed, flushing the VIDs of a subset of VLANs assigned for protection, related to the ring port from the FDB.

\* \* \* \* \*